(12) United States Patent
Yamazaki et al.

(10) Patent No.: US 9,188,303 B2
(45) Date of Patent: Nov. 17, 2015

(54) AUTOMOTIVE HEADLAMP

(71) Applicants: MABUCHI MOTOR CO., LTD., Chiba (JP); Koito Manufacturing Co., Ltd., Tokyo (JP)

(72) Inventors: Hiroshi Yamazaki, Chiba (JP); Noritaka Minakawa, Chiba (JP); Shoichiro Yokoi, Shizuoka (JP)

(73) Assignees: Mabuchi Motor Co., Ltd., Matsudo, Chiba (JP); Koito Manufacturing Co., Ltd., Tokyo (JP)

( * ) Notice: Subject to any disclaimer, the term of this patent is extended or adjusted under 35 U.S.C. 154(b) by 214 days.

(21) Appl. No.: 13/836,149

(22) Filed: Mar. 15, 2013

(65) Prior Publication Data

US 2013/0258695 A1 Oct. 3, 2013

(30) Foreign Application Priority Data

Mar. 30, 2012 (JP) ................................ 2012-082641

(51) Int. Cl.
| | |
|---|---|
| *B60Q 1/00* | (2006.01) |
| *F21V 11/00* | (2015.01) |
| *H02K 5/00* | (2006.01) |
| *H02N 1/00* | (2006.01) |
| *F21S 8/10* | (2006.01) |
| *H02K 13/10* | (2006.01) |

(52) U.S. Cl.
CPC ......... *F21S 48/1784* (2013.01); *F21S 48/1773* (2013.01); *H02K 13/10* (2013.01)

(58) Field of Classification Search
CPC .............. F21S 48/1768; F21S 48/1773; F21S 48/1778; F21S 48/1784; F21S 48/1789; F21S 48/1794

USPC ........... 362/512–514, 539; 310/40 MM, 233, 310/234, 241

See application file for complete search history.

(56) References Cited

U.S. PATENT DOCUMENTS

| | | | | |
|---|---|---|---|---|
| 3,937,423 A | * | 2/1976 | Johansen | 244/3.22 |
| 5,373,424 A | * | 12/1994 | Ishikawa | 362/538 |
| 6,658,326 B2 | * | 12/2003 | Trapasso | 700/280 |
| 6,857,768 B2 | * | 2/2005 | Watanabe et al. | 362/512 |
| 7,364,331 B2 | * | 4/2008 | Tajima | 362/509 |

(Continued)

FOREIGN PATENT DOCUMENTS

JP 2010-009766 1/2010

OTHER PUBLICATIONS

Koito MFG Co Ltd (JP2010-009766) English Machine Translation.*

*Primary Examiner* — Jong-Suk (James) Lee
*Assistant Examiner* — Alexander Garlen
(74) *Attorney, Agent, or Firm* — Schwabe, Williamson & Wyatt

(57) ABSTRACT

An automotive headlamp includes: a light source; a movable shade configured to be movable between a first position shielding a part of light emitted from the light source and a second position having a different light shielding volume; a motor configured to generate a driving force to move the shade from the first position to the second position; and a stopper for high beam to fix the movable shade, which has been moved from the first position to the second position, at the second position. The motor is configured such that a motor phase is lag when the motor moves the movable shade to the second position by the driving force generated by supplied power and fixes the same, and an electric current is applied to the motor when the movable shade is fixed at the second position.

2 Claims, 10 Drawing Sheets

(56) References Cited

U.S. PATENT DOCUMENTS 7,600,903 B2 * 10/2009 Mensales et al. ............. 362/507
7,618,170 B2 * 11/2009 Sugiyama et al. ............ 362/510
2009/0322188 A1 * 12/2009 Yamazaki et al. ...... 310/40 MM

* cited by examiner

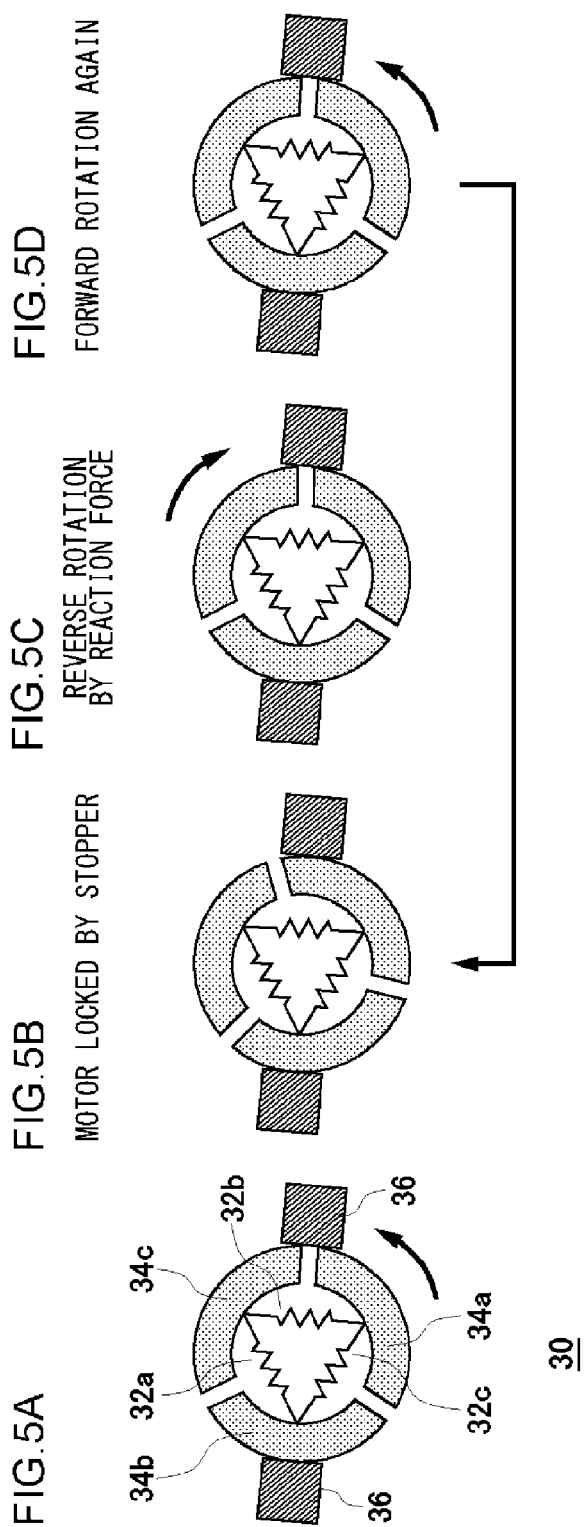

12

AUTOMOTIVE HEADLAMP

CROSS-REFERENCE TO RELATED APPLICATIONS

This application is based upon and claims the benefit of priority from the prior Japanese Patent Application No. 2012-082641, filed on March 30, the entire content of each of which is incorporated herein by reference.

BACKGROUND OF THE INVENTION

1. Field of the Invention

The present invention relates to a technology concerning an automotive headlamp, for example, an automotive headlamp capable of switching light distribution patterns.

2. Description of the Related Art

Traditionally, an automotive headlamp, which has a projector type lamp unit projecting and distributing reflected light forward from a reflector by a projection lens, is known (JP 2010-9766 A). This automotive headlamp is capable of switching light distribution patterns by arranging a movable light shielding shade for light distribution control between the reflector and the projection lens. In this automotive headlamp, the light shielding shade is moved by a motor.

The automotive headlamp described above moves the shade until it abuts against a stopper by driving the motor when a high beam light distribution pattern is formed. The automotive headlamp includes a spring to bring back the shade to a low beam light distribution pattern forming position when the motor is not driven.

However, it is necessary for the automotive headlamp described above to continue supplying power to the motor with the shade abutting against the stopper in order to hold the shade at a high beam light distribution pattern forming position. Therefore, it was found that the motor vibrates and an abnormal noise (high frequency noise) is generated when the power is supplied to the motor when the rotation of the motor is stopped. The generated abnormal noise continues until the motor is turned off.

SUMMARY OF THE INVENTION

The present invention has been made in view of these circumstances, and a purpose of the invention is to provide a technique for reducing the abnormal noise (high frequency noise) generated by the motor that moves the shade of the automotive headlamp.

To solve the problem above, an automotive headlamp according to an aspect of the present invention includes: a light source; a shade configured to be movable between a first position shielding a part of light emitted from the light source and a second position having a different light shielding volume; a motor configured to generate a driving force to move the shade from the first position to the second position; and a fixing part configured to fix the shade, which has been moved from the first position to the second position, at the second position. The motor is configured such that a motor phase is lag when the motor moves the shade to the second position by the driving force generated by supplied power and fixes the same, and an electric current is applied to the motor when the shade is fixed at the second position.

BRIEF DESCRIPTION OF THE DRAWINGS

FIGS. 5A to 5D are schematic views for explaining the movement of a motor in each rotation angle position;

DETAILED DESCRIPTION OF THE INVENTION

Figure 1:
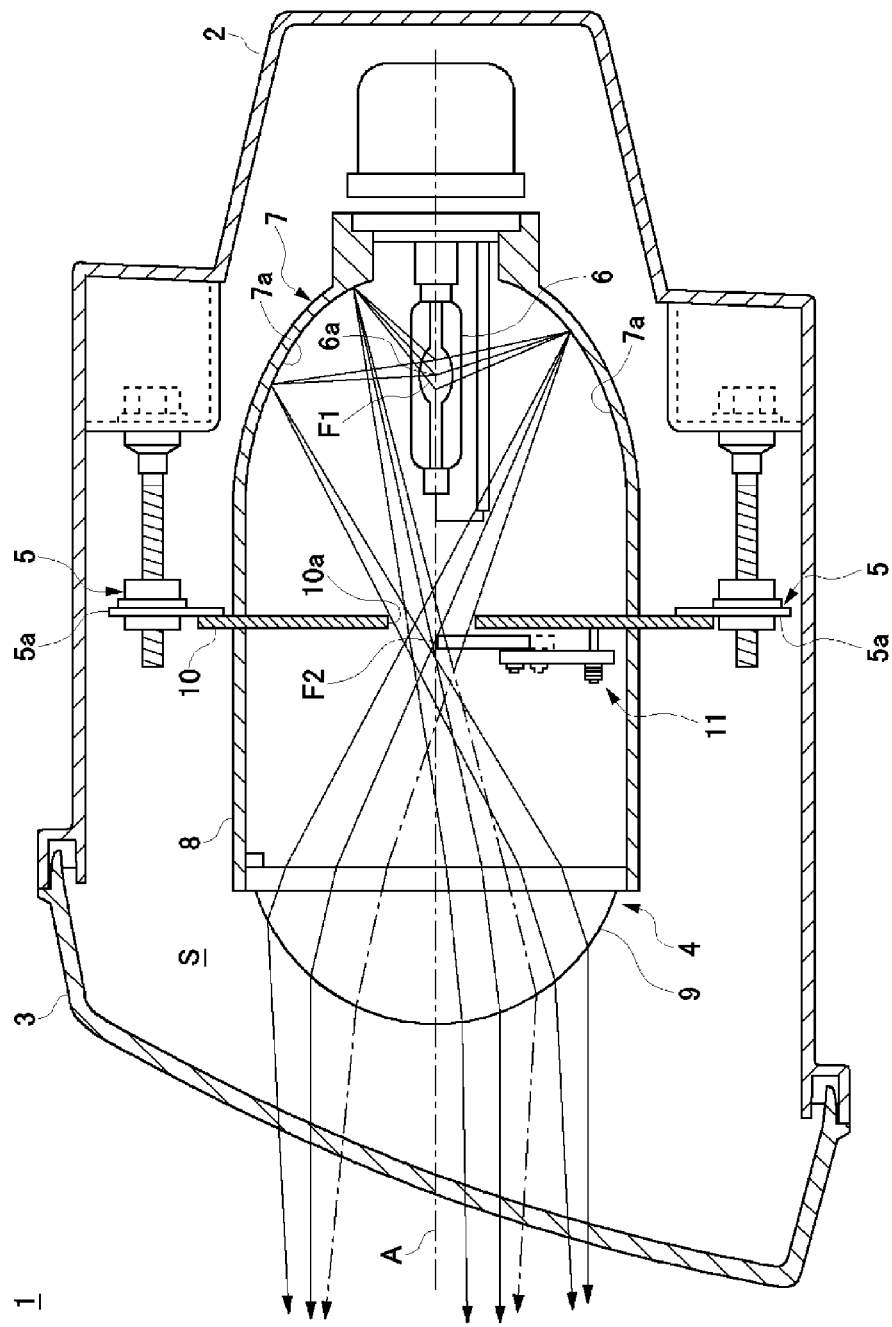
FIG. 1 is a cross-sectional view of an automotive headlamp in the front-back direction of the vehicle according to the present embodiment.

An automotive headlamp according to the present embodiment includes: a light source; a shade configured to be movable between a first position shielding a part of light emitted from the light source and a second position having a different light shielding volume; a motor configured to generate a driving force to move the shade from the first position to the second position; and a fixing part configured to fix the shade, which has been moved from the first position to the second position, at the second position. The motor is configured such that a motor phase is lag when the motor moves the shade to the second position by the driving force generated by supplied power and fixes the same, and an electric current is applied to the motor when the shade is fixed at the second position.

According to this aspect, the motor, of which a motor phase is lag when the shade is moved to the second position, is used. Therefore, when the shade is fixed at the fixing part and the motor is locked at the position near the rotation position where the rectification is switched, the generated torque is smaller than a motor, of which a motor phase is lead, even if the motor rotates in reverse by the reaction force generated at the time when the motor is locked. Therefore, the possibility that the motor rotates again is small so that the motor vibration (the abnormal noise), generated by the repetition of locking and rotation of the motor, can be reduced.

The automotive headlamp may further include an elastic member for generating a force pushing back the shade from the second position to the first position. The motor may be configured to generate the driving force to move the shade to the second position against the force generated by the elastic member. This enables the shade to return to the first position without driving the motor. Therefore, in the design of the motor, it is only necessary to consider rotation in one direction. The design of the motor, of which the motor phase is lag in the predetermined rotation direction, becomes easier.

The invention will now be described by reference to the preferred embodiments. This does not intend to limit the scope of the present invention, but to exemplify the invention.

Hereinbelow, the detailed description of the present invention is given with reference to the drawings. The same symbols are used for the same elements in the drawings, and redundant explanation is omitted.

(Automotive Headlamp)

Figure 2:
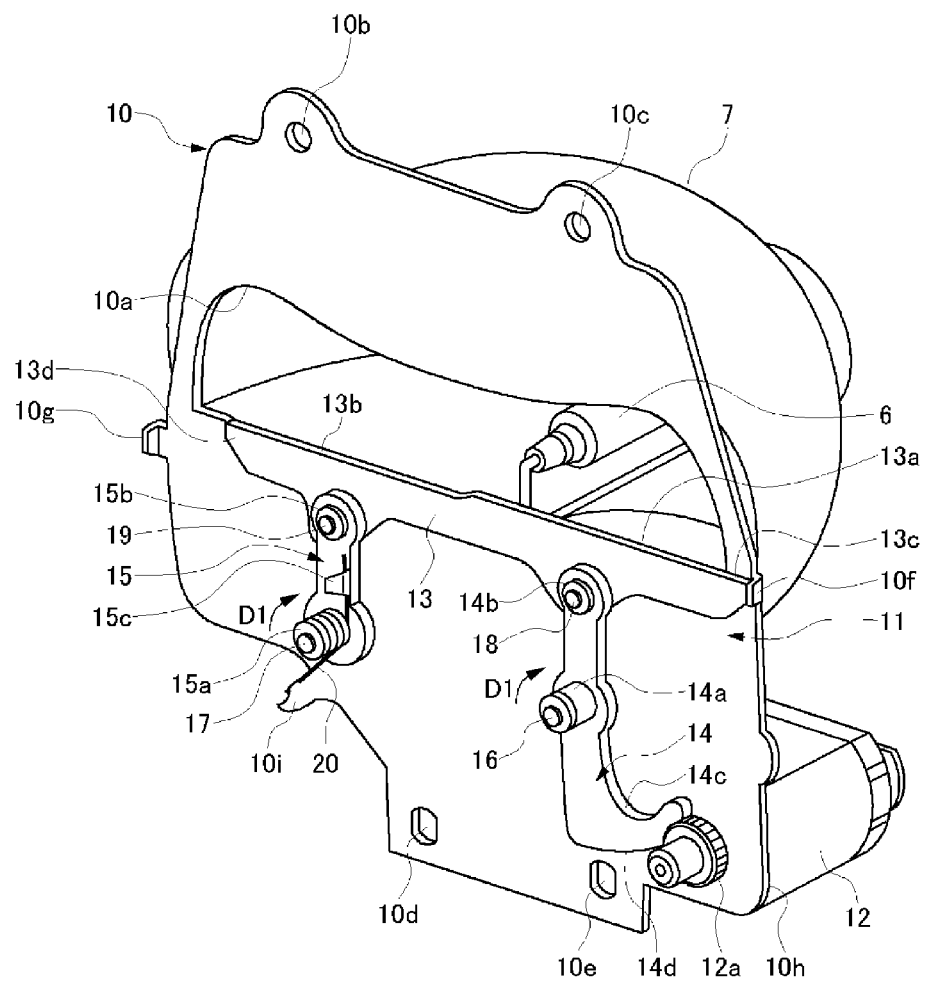
FIG. 2 is a perspective view of a lamp unit for performing a low beam light distribution.
Figure 3:
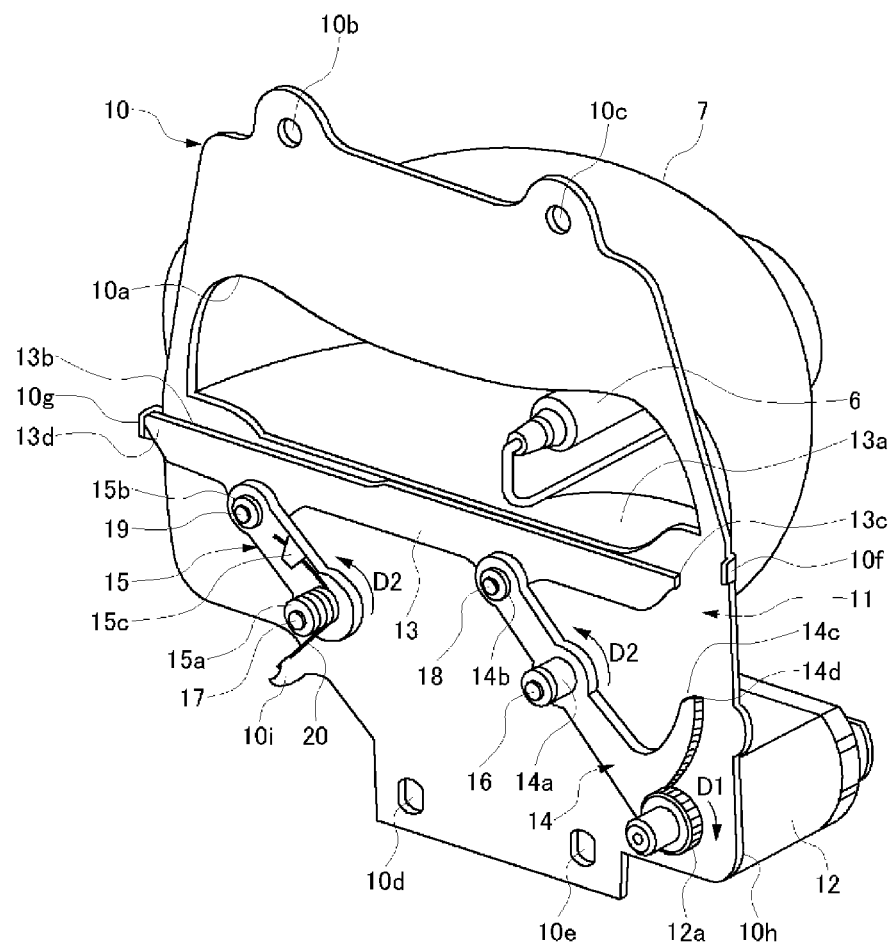
FIG. 3 is a perspective view of a lamp unit for performing a high beam light distribution.
Figure 4A:
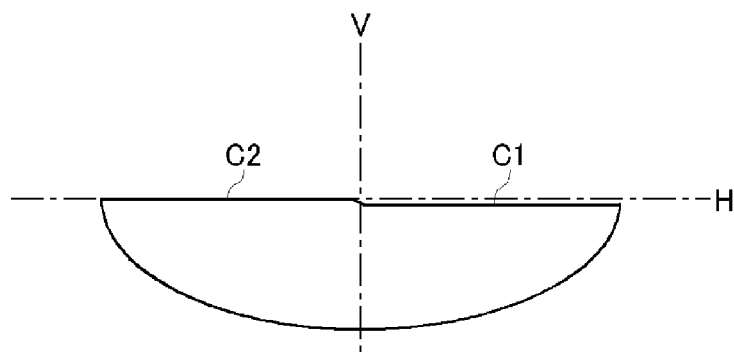
FIG. 4A is a view of a low beam light distribution pattern in the case where the shade is in the state of FIG. 2.
Figure 4B:
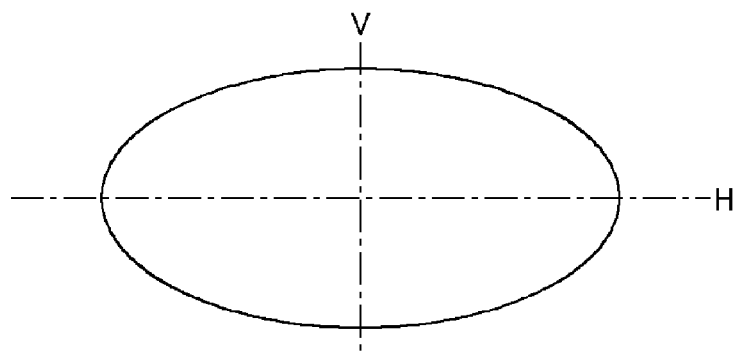
FIG. 4B is a view of a high beam light distribution pattern in the case where the shade is in the state of FIG. 3.

First, one aspect of an automotive headlamp suitable for applying the present invention is explained. FIG. 1 is a cross-sectional view of the automotive headlamp in the front-back direction of the vehicle according so the present embodiment. FIG. 2 is a perspective view of a lamp unit for performing a low beam light distribution. FIG. 3 is a perspective view of a lamp unit for performing a high beam light distribution. FIG. 4A is a view of a low beam light distribution pattern in the case where the shade is in the state of FIG. 2. FIG. 4B is a view of a high beam light distribution pattern in the case where the shade is in the state of FIG. 3.

As shown in FIG. 1, an automotive headlamp 1 according to the present embodiment includes a lamp body 2 and a front lens 3 covering a front opening portion of the lamp body 2. The space surrounded by the lamp body 2 and the front lens 3 is a lamp chamber S. A projector type lamp unit 4 is built in the lamp chamber S. The lamp unit 4 is held, tiltably in up-down and right-left directions, in the lamp body 2 by being mounted on aiming mechanisms 5 (there are three aiming mechanisms as viewed from the front, partially not shown).

The lamp unit 4 includes a discharge bulb 6, a reflector 7, a holder 8, a projection lens 9, a base 10, a movable shade unit 11 and the like.

The reflector 7 is formed in a bowl-like shape and includes a light-reflecting surface 7a inside. The light-reflecting surface 7a is formed in a shape of a substantially rotated elliptical surface arranged around an optical axis A, which extends in the front-back direction of the vehicle, as the central axis. On a rear end portion of the reflector 7, the discharge bulb 6 (for example, a metal halide bulb is used) is attached on the optical axis A, and a light source 6a (a light emission center) thereof is arranged adjacent to a first focal point F1 of the reflector 7. The holder 8 is formed as a cylinder, and a rear end portion thereof is integrated with a front end portion of the reflector 7 together with the base 10 sandwiched therebetween. The projection lens 9 is mounted to a front end opening portion of the holder 8.

Next, referring to FIGS. 2 and 3, the base 10 and the movable shade unit 11 are explained. The movable shade unit 11 is mounted on the front surface of the base 10 held between the reflector 7 and the holder 8. The base 10 is arranged between the discharge bulb 6 and the projection lens 9, and the front surface thereof is configured of a plate-like member perpendicular to the optical axis A (refer to FIG. 1). The base 10 includes a slit 10a, through which the reflected light of the reflector is passed, and mounting openings 10b to 10e for coupling the base 10 with a holding bracket 5a of the aiming mechanism 5 by screws or the like. The slit 10a and the mounting openings 10b to 10e pass through the base 10 in the direction of the optical axis A. Stoppers 10f and 10g of the movable shade unit 11, which will be described below, are provided on both sides of the base 10. A mounting portion 10h of a motor 12 to be as a driving source of the movable shade unit 11 is provided on the rear portion of the base 10.

The movable shade unit 11 includes a movable shade 13, parallel links 14 and 15, first rotating shafts 16 and 17, and second rotating shafts 18 and 19.

The parallel links 14 and 15 according to the present embodiment include the motor-side link 14 for receiving the driving force of the motor 12 and the spring-side link 15 for receiving bias torque by a torsion spring 20 in the direction opposite to the driving force of the motor 12.

The motor-side link 14 includes a bearing part 14a of the first rotating shaft 16 in the center and a bearing part 14b of the second rotating shaft 18 in the upper end portion. The link 14 is formed in a substantially L-shape, of which the lower end portion is extending laterally, as viewed from the front, and includes a tooth part 14d on the under surface of a lower end L-shaped part 14c formed as an arc. The spring-side link 15 includes a bearing part 15a of the first rotating shaft 17 in the center and a bearing part 15b of the second rotating shaft 19 in the upper end portion. Each of the links 14 and 15 is formed such that a distance between the centers of the bearing parts 14a and 14b on the motor-side link 14 is identical to that of the bearing parts 15a and 15b on the spring-side link 15.

The first rotating shafts 16 and 17 and the second rotating shafts 18 and 19 are configured of shafts and the like. The first rotating shafts 16 and 17 are mounted on the base 10 so that the heights of the shaft centers become the same. By being rotatably mounted to the first rotating shafts 16 and 17 via the bearing parts 14a and 15a, respectively, the links 14 and 15 are supported by the base 10.

On the other hand, the second rotating shafts 18 and 19 are mounted on the movable shade 13 so that a distance between the centers of the shafts thereof is identical to that of the first rotating shafts 16 and 17. The links 14 and 15 support the movable shade 13 by being rotatably mounted to the second rotating shafts 18 and 19 via the bearing parts 14b and 15b, respectively. Mounting positions of she second rotating shafts 13 and 19 on the movable shade 13 are the places where the upper edge of the movable shade 13, i.e., horizontal cut-off line forming parts 13a and 13b, is level when the links 14 and 15 are mounted.

According to the configuration above, when one of the motor-side link 14 and the spring-side link 15 rotates around the first rotating shaft, the other one functions as a parallel link that rotates around the first rotating shaft while the two links keep parallelism therebetween. The parallel links 14 and 15 allow the horizontal cut-off line forming parts 13a and 13b of the movable shade 13 to be level, and move them upward and downward substantially perpendicular to the optical axis A.

On the other hand, the parallel links 14 and 15 rotate by using the motor 12 and the torsion spring 20 as driving sources. A front end of the rotation axis (not shown) of the motor 12, which is mounted on the back of the base 10, penetrates the base 10 forward. The motor 12 has a gear 12a that rotates on the front end of the rotation axis. Upon receiving rotation torque (the rotation torque in a clockwise direction D1 as viewed from the front in the present embodiment) from the motor 12, the gear 12a engages with the tooth part 14d of the motor-side link 14. The gear 12a allows the motor-side link 14 to rotate around the first rotating shaft 16 by giving torque (the rotation torque in a counterclockwise direction D2 as viewed from the front in the present embodiment) so the link 14, and also allows the spring-side link 15 to rotate around the first rotating shaft 17.

The torsion spring 20 is arranged around the bearing part 15a. One end of the torsion spring 20 is mounted to a spring receiving part 10i of the base 10, and another end is mounted to a spring receiving part 15c of the spring-side link 15. The torsion spring 20, which is an elastic body, is mounted so that the torsion spring 20 always biases the torque in a direction opposite to the torque (the rotation torque in the clockwise direction D1 as viewed from the front in the present embodiment) by the motor 12 to the spring-side link 15. When the driving of the motor 12 is stopped, the torsion spring 20 rotates the spring-side link 15 around the first rotating shaft 17 in the direction opposite to the motor, and also rotates the motor-side link 14 in the direction opposite to the motor.

The parallel links described above are not limited to the two links 14 and 15, and the parallel links may be configured of three or more links, as long as the links keep the horizontal cut-off line forming parts 13a and 13b of the movable shade 13 in a horizontal position and move them upward and downward substantially perpendicular to the optical axis A, while the links keep parallelism therebetween. The torsion spring 20 can be mounted to the motor-side link 14, but it is desirable that the torsion spring 20 be mounted to the link 15 so as to reduce backlash of the link 15.

Next, the movement of the movable shade unit 11 at the time of switching the light distribution patterns is explained. According to the configuration described below, the automotive headlamp 1 of the present embodiment always forms the low beam light distribution pattern when the motor 12 is not driven, and switches the pattern to the high beam light distribution pattern when the motor 12 is driven so as to move the movable shade 13.

The movable shade unit 11 is configured such that, when the motor 12 is not driven, the movable shade 13 is at the low beam light distribution pattern forming position in FIG. 2 (an initial position: equal to the first position). At the initial position, the parallel links 14 and 15 are located in the vertical direction, and the horizontal cut-off line forming parts 13a and 13b of the movable shade 13 are positioned adjacent to a second focal point F2 of the reflector 7, i.e., at the highest position in a movable range. On the right side of the base 10, the stopper 10f for low beam is provided projecting forward. At the initial position, a right end 13c of the movable shade 13 abuts against the stopper 10f.

By the links 14 and 15 receiving, from the torsion spring 20, the rotation torque in the clockwise direction D1 as viewed from the front, the right end 13c of the movable shade 13 at the initial position is pressed against the stopper 10f. Therefore, the links 14 and 15 are fixed unrotatably at the initial position.

The light emitted from a light source 6a (adjacent to the first focal point F1 of the reflector 7) of the discharge bulb 6 is reflected adjacent to the second focal point F2 along the optical axis A by the reflector 7. The light is radiated to the outside of the automotive headlamp 1 through the projection lens 9. The movable shade 13 at the initial position shields a part of the reflected light from the reflector 7 near the second focal point F2 and forms the low beam light distribution pattern shown in FIG. 4A. The alternate long and short dashed lines among the light beams illustrated in FIG. 1 show the reflected light shielded by the movable shade 13. A horizontal, cut-off line C1 in FIG. 4A is formed corresponding to the horizontal cut-off line forming part 13a, and a horizontal cut-off line C2 is formed corresponding to the horizontal cut-off line forming part 13b.

On the other hand, the movable shade unit 11 is configured such that driving the motor 12 allows the links 14 and 15 to rotate so as to move the movable shade 13 to the high beam light, distribution pattern forming position shown in FIG. 3. That is, when the rotation torque of the motor 12 goes beyond the bias torque in the opposite direction by the torsion spring 20, the parallel links 14 and 15 each rotate in the counterclockwise direction D1 as viewed from the front. At that time, the horizontal cut-off line forming parts 13a and 13b of the movable shade 13 are kept in horizontal position, and descend from a place adjacent to the optical axis A to a place where they do not interfere with the reflected light from the reflector 7 (the high beam light distribution pattern forming position: equal to the second position). On the left side of the base 10, the stopper 10g for high beam is provided projecting forward. At the high beam light distribution pattern forming position, a left end 13d of the movable shade 13 abuts against the stopper 10g. When the movable shade 13 moves to the high beam light distribution pattern forming position, the movable shade unit 11 is fixed at the high beam light distribution pattern forming position, since the left end 13d of the movable shade 13 is pressed against the stopper 10g. At that time, the reflected light from the reflector 7 is different from that in the case where the movable shade 13 is at the initial position. The reflected light from the reflector 7 forms the high beam light distribution pattern shown in FIG. 4B and is emitted forward through the projection lens 9 without allowing the alternate long and short dashed lines among the light beams illustrated in FIG. 1 to be shielded by the movable shade 13.

In the case of shutting off the electric current to the motor 12, the links 14 and 15 respectively rotate around the first rotating shafts 16 and 17 in the clockwise direction D1 as viewed from the front by the torsion spring 20. By the right end 13c of the movable shade 13 abutting against the stopper 10f for low beam, the links 14 and 15 are refixed at the initial positions.

As described above, the automotive headlamp 1 according to the present embodiment includes the discharge bulb 6 that is the light source, the movable shade 13 which is configured such that the low beam light distribution pattern is formed by shielding a part of the light emitted from the discharge bulb 6 at the first position and the high beam light distribution pattern is also formed at the second position different from the first position, the motor 12 which generates the driving force to move the movable shade 13 from the first position to the second position, and the stopper 10g for fixing the movable shade 13 at the second position by being abutted against the movable shade 13 which has been moved from the first position to the second position.

The movable shade unit 11 further includes the torsion spring 20, which generates force to push back the movable shade 13 from the second position to the first position.

The movable shade 13 slides in a direction perpendicular to the optical axis A, not in the front-back direction, of the vehicle. Therefore, the depth of the lamp unit 4 can be narrowed, and the width of the automotive headlamp 1 in the front-back direction can be reduced. The base 10 and the movable shade unit 11 are mainly made of a plate member having no complicated bend, and as a result, the configuration of the base 10 and the movable shade unit 11 is comparatively easy to make and simple.

Because the links 14 and 15 face in the vertical direction in the case of driving a vehicle with the low beam, the links 14 and 15 hardly receives the rotation torque (the rotational moment around the first rotating shafts 16 and 17) generated by the vertical vibration of the vehicle. Therefore, the automotive headlamp 1 of the present embodiment is configured such that the links 14 and 15 are difficult to rotate by the vibration and the light distribution pattern in the case of driving the vehicle with the low beam hardly loses its form. Therefore, the links 14 and 15 can be prevented from rotating by the vibration described above even when the torsion spring 20 with small bias torque is adopted. Thus, the motor 12 can rotate the links 14 and 15 against the torque of the torsion spring 20 even when a motor with small rotation torque is adopted. Therefore, a compact motor can be adopted for the motor 12 of the automotive headlamp 1 of the present embodiment.

Since the movable shade unit 11 of the present embodiment is thin in the front-back direction of the vehicle, a light distribution pattern other than the low beam distribution pattern and the high beam distribution pattern may be formed by arranging another movable shade unit in the front-back direction of the vehicle in an overlapped manner. In this case, since the movable shade is configured to slide in the up-and-down direction perpendicular to the optical axis, it is desirable that the motor 12 and a motor of the additional movable shade unit be symmetrically arranged across the optical axis A.

The automotive headlamp 1 of the present embodiment is configured such that, in the case where the electric current to the motor 12 is shut off, including the case where a malfunction occurs, a fail-safe function is realized, i.e., the movable shade 13 always returns, to the low beam light distribution pattern forming position from the high beam light distribution pattern forming position.

The parallel links 14 and 15 are used as the plurality of links in the present embodiment, but a link other than the parallel links can be adopted as long as the link mechanism has a single degree of freedom.

(Abnormal Noise of a Motor Generating Mechanism)

The automotive headlamp 1 according to the present embodiment has the motor 12 to which the power is continuously supplied while the high beam light distribution pattern is formed, even when the movable shade 13 is moved to the high beam light distribution pattern forming position and the rotation of the motor 12 is stopped (motor lock) by the mechanical stopper 10g. That is, the motor 12 continues to be supplied with the electric current when the movable shade 13 is fixed at the high beam light distribution pattern forming position. It is found that the motor 12 vibrates and the abnormal noise (high frequency noise) is generated by the power supplied after the rotation of the motor 12 is stopped. The generated abnormal noise continues until the motor is turned off.

Such an abnormal noise generating mechanism is explained hereinbelow. FIGS. 5A to 5D are schematic views for explaining the movement of the motor in each rotation angle position. In a motor 30 shown in FIG. 5A, both ends of each of three rotor windings 32a, 32b, and 32c are connected between corresponding commutator segments 34a, 34b, and 34c adjacent to each other. A pair of brushes 36, arranged opposite to each other at a 180° interval, is in contact with the commutator segments. Note that it is assumed that the brushes 36 are worn out. It is also assumed that the motor 30 starts to rotate in a direction of the arrow from the position shown in FIG. 5A, and a member coupled with the rotation shaft of the motor 30 abuts against the stopper so that the motor 30 is locked at the position shown in FIG. 5B. In this condition, the motor is still turned on. Next, as shown in FIG. 5C, the motor slightly rotates in reverse by a reaction force based on the elasticity of a stopping mechanism including a resin gear or the like. The state shown in FIG. 5C is the same as that in FIG. 5A. As shown in FIG. 5D, the torque increases and the motor rotates again. Similarly to FIG. 5B, the motor abuts against the stopper and is locked again. This is shown in FIG. 5B. The motor repeats the movement described above.

In this way, while the motor is turned on, the motor repeats the movements shown in FIGS. 5B, 5C, and 5D and a magnetic force changes, and the motor vibrates and generates the abnormal noise. That is, the motor repeats the state in which the torque increases when the motor is locked and rotates in reverse by the reaction force, and the motor rotates again until locked. More specifically, if the motor rotation angle position in the case where the motor is locked is in a high torque position, the motor stops at the angle position and the abnormal noise is not generated. However, if the motor rotation angle position in the case where the motor is locked is in a low torque position, the motor rotates in reverse by the reaction force and rotates again when the motor rotation angle position reaches the high torque position. At this time, for the reasons mentioned above, the abnormal noise is generated. The high frequency noise may be generated by a spark generated by a rectification switching, and the high frequency noise may be recognized as a radio noise by an occupant of the vehicle.

Figure 6A:
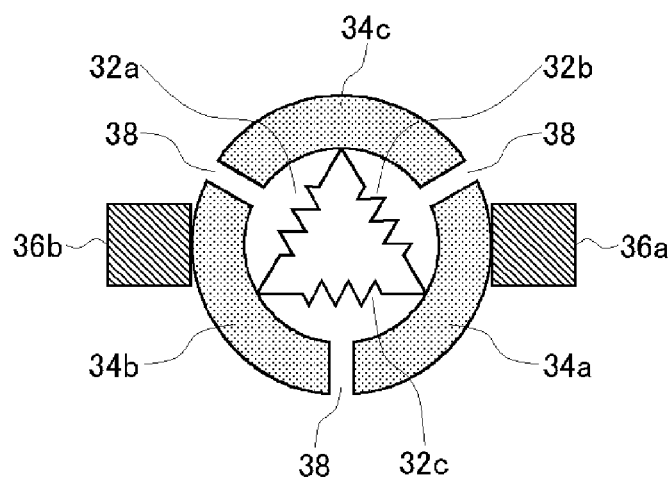
FIGS. 6A and 6B are schematic views for explaining an increase of torque generated by a change of the motor angle position.
Figure 6B:
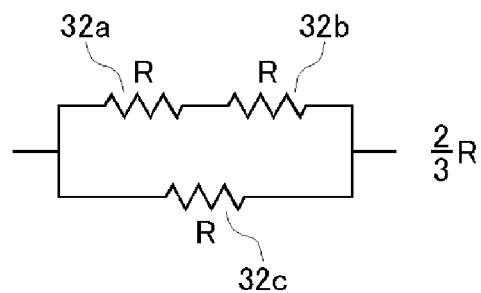

FIGS. 6A, 6B, 7A, and 7B are schematic views for explaining an increase in torque caused by a change of the motor angle position. As shown in FIG. 6A, three commutator segments 34a, 34b, and 34c are provided having slits 38 therebetween. Now, as shown in FIG. 6A, a pair of brushes 36a and 36b is respectively positioned on the different commutator segments 34a and 34b. Between the pair of brushes 36a and 36b, two series-connected windings 32a and 32b and another winding 32c are connected in parallel. FIG. 6B is an equivalent circuit diagram of this condition. Assuming that R represents each winding resistance, a combined resistance between the two brushes is 2R/3.

Figure 7A:
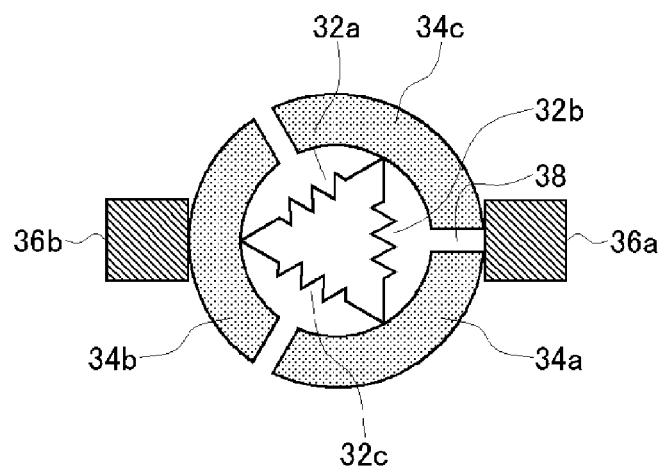
FIGS. 7A and 7B are schematic views for explaining an increase of torque generated by a change of the motor angle position.
Figure 7B:
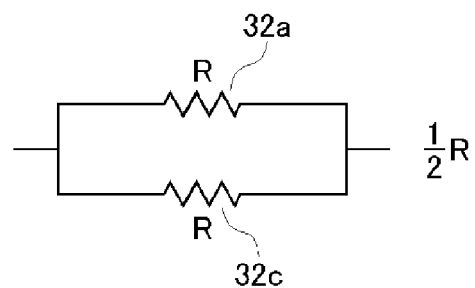

Next, it is assumed that the motor rotates to the position shown in FIG. 7A. At this time, the one brush 36a, which is arranged opposite to the brush 36b, is positioned on the slit 38 between the two commutator segments 34a and 34c. At this time, if the brush 36a is worn out, the two windings are connected in parallel between the pair of brushes 36a and 36b because the one winding 32b is short-circuited by the brush 36a. FIG. 7B is an equivalent circuit diagram of this condition. Assuming that R represents each winding resistance, a combined resistance between the two brushes is R/2. In this way, the motor in the angle position shown in FIG. 7A has a smaller combined resistance between the two brushes, and conversely has a larger current flowing, i.e., larger torque, than that in FIG. 6A.

When the motor is locked by the stopper, if one brush is positioned on the slit between the two commutator segments, large torque is generated and the motor hardly rotates in reverse. When the motor rotates in reverse by the reaction force generated after the motor is locked by the stopper, if the one brush is positioned on the slit between the two commutator segments, the motor starts to rotate again with large torque. When the position of the brush, in the case where the motor rotates in reverse by the reaction force, is not on the slit between the commutator segments, the torque does not increase and the abnormal noise is not generated. However, the position of the brush, in the case where the motor is locked by the stopper or in the case where the motor rotates in reverse by the reaction force, is stochastic. It is virtually difficult to control the motor rotation such that the brush is positioned on the slit between the commutator segments when the motor is locked or the motor is positioned avoiding the slit, between the commutator segments when the motor rotates in reverse.

A motor suitable for the automotive headlamp according to the present embodiment has been devised based on such findings.

Figure 8:
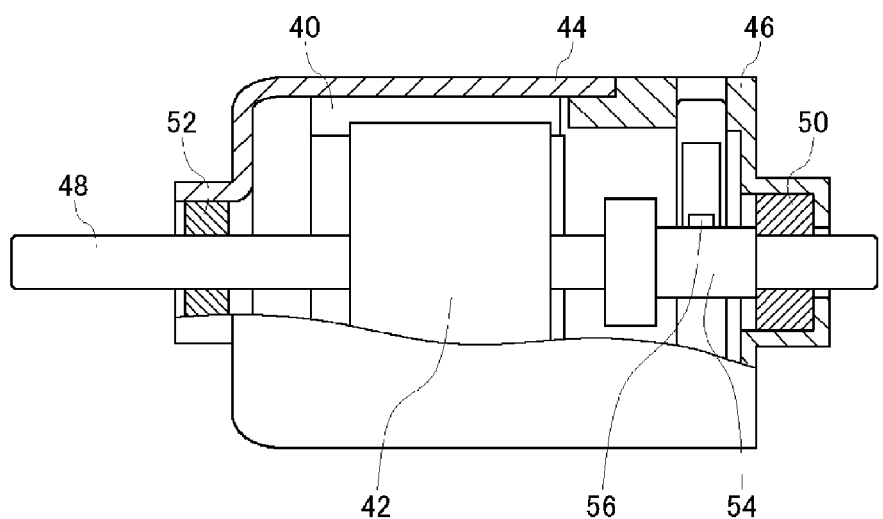
FIG. 8 is a partial cross-sectional view schematically showing a configuration of the motor according to the present embodiment.

FIG. 8 is a partial cross-sectional view schematically showing a configuration of the motor 12 according to the present embodiment. Hereinbelow, a motor having two (a pair of) stator poles (magnet 40) and three rotor poles 42 is explained as an example. The present invention can also be applied to a motor having four (two pairs of) stator poles and six rotor poles. In this case, the present invention can be applied to a motor having four stator poles and six rotor poles by reducing the exemplary angle to half. In other words, an exemplary angle below shows an angle per pair number of stator poles. On the inner circumferential surface of a casing 44, which is made of metallic material and is formed in a hollow cylindrical shape with a bottom, the magnet 40, which is configured of an even number (for example, two) of poles, is mounted. To an opening portion of the casing 44, an end bell (casing cover) 46, which is made of insulating material (made of a synthetic resin), is fitted and thereby the inside of the casing 44 is sealed. In the central part of the end bell 46, a bearing 50 rotatably supporting a motor shaft 48 is accommodated.

Another end of the motor shaft 48 is supported by a bearing 52 provided in the center of the bottom of the casing 44 formed in a hollow cylindrical shape with a bottom. The rotor pole 42, which is configured by winding the winding around a lamination core, and a commutator 54 are fixed on the motor shaft 48. A rotor of the motor with the brush is configured of the motor shaft 48, the rotor pole 42, and the commutator 54. A pair of carbon brushes 56 being in contact with the commutator 54 is respectively mounted on a brush device fixed on the end bell 46.

Figure 9A:
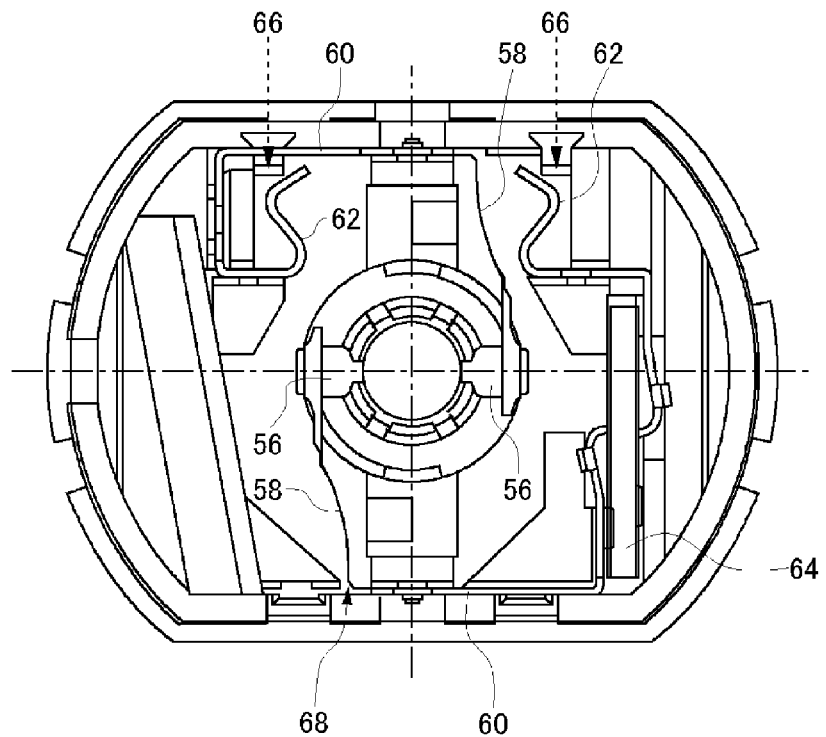
FIG. 9A is a view of an exemplary end bell, of a motor with brushes as viewed from the inside.
Figure 9B:
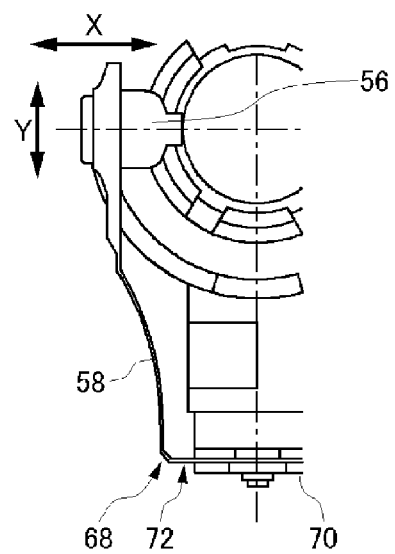
FIG. 9B is a view showing one each of the brushes and brush arms extracted.

FIG. 9A is a view of an exemplary end bell of a motor with brushes as viewed from the inside FIG. 9B is a view showing one each of the brushes and brush arms extracted. A bipolar magnet, which is mounted on the inner circumferential surface of the casing to which the end bell shown in FIG. 9A is fitted, is arranged in a horizontal direction of FIG. 9A. As shown in FIG. 9A, the brush device includes the pair of carbon brushes 56 in sliding contact with the commutator (not shown), a pair of brush arms (supporting means) 58 respectively press fitting and holding the pair of carbon brushes, a pair of brush bases 60 coupled to the brush arms 58 by swaging or the like, and a pair of receptacle terminals 62 connected to (or integrated with) the brush bases. However, in the example shown, an element, which detects an overcurrent and prevents burn, such as a PTC (positive temperature coefficient thermistor) 64 is connected in series between one of the receptacle terminals 62 and the carbon brushes 56.

The carbon brush 56 is configured such that the carbon brush 56 is mounted to the brush arm 58 having a spring characteristics in order to obtain appropriate brush pressure so as so slide on the commutator 54 of the rotor. The brush device with such a configuration is press fitted into and is held in a recess defined by columnar portions formed integral with itself in the end bell 46 made of a synthetic resin. In order to supply power to the brush device, a par of external terminals is inserted into the end bell from outside through external terminal insertion holes 66 and is brought into electrical contact with the pair of receptacle terminals 62, respectively.

As indicated by an arrow in FIG. 9B, the carbon brush 56 shown in FIG. 9B is mounted to be movable in two directions, i.e., a radial direction X of the commutator with which the brush is in sliding contact and a tangential direction Y perpendicular to the radial direction X. To make this possible, the brush arm 58 includes a bent part (a curvature part 68) at its base side. That is, the brush arm 58 is mounted substantially in parallel with and in the same direction as the radial direction X at the side where the brush arm 58 is fixed to the brush base tip part 70 (for example, caulking fixation). After extending a predetermined distance in the direction (shown as an extension part 72 in FIG. 9B), the brush arm 58 is bent in the direction toward the brush 56 substantially perpendicular to the radial direction X at the curvature part 68 formed by bending at the position far from the fixing part.

The commutator 54 according to the present embodiment is fixed to the motor shaft 48 at a position where the slit position relative to the rotor pole is at the lag side of the neutral position, and the motor is rectified at the lag side. That is, the motor 12 is configured such that a motor rectification phase is lag.

Figure 10:
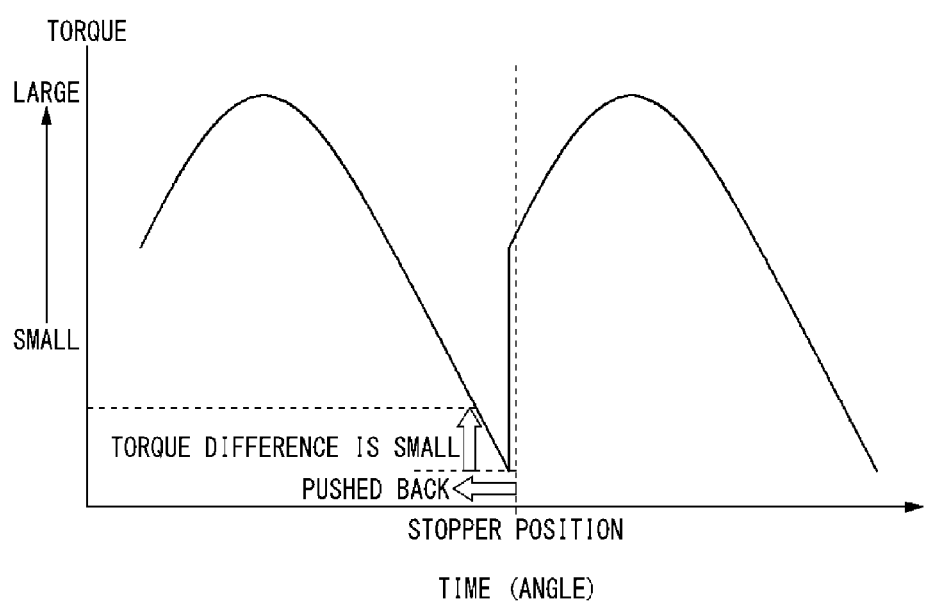
FIG. 10 is a view schematically showing a torque ripple in the case where a rectification phase of the motor is lag.

FIG. 10 is a view schematically showing a torque ripple in the case where a motor rectification phase is lag. The horizontal axis represents time (angle), and the vertical axis represents generated torque. When the motor rectification phase is lag, as shown in FIG. 10, the torque of the motor tends to significantly decrease as the timing of the switching of the rectification gets closer, and the torque tends to rapidly increase right after the switching of the rectification.

As described above referring to FIG. 5, the position of the brush is determined stochastically. However, when the motor rotates in reverse by the reaction force generated after the motor is locked by the stopper, if one of the worn-out brushes is positioned on the slit between the two commutator segments, the motor rotates again depending on the magnitude of the torque. However, even in this case, the increase of the generated torque can be suppressed by setting the rectification phase of the motor as described above.

As is well known, a voltage difference between a power supply voltage, which is a constant value, and a counter electromotive force is applied to a motor winding. When the brush starts to be in contact with a first commutator segment, a substantially large voltage is applied to the motor winding due to a low counter electromotive force. However, the motor winding has an inductance. Therefore, the current rises at a predetermined time constant. After rising, the current decreases as the counter electromotive force increases. The torque also decreases in proportion to the current. When a brush contact line reaches the slit between the commutator segments, the current through the first commutator segment is turned off, and the brush contact line starts to be in contact with the second commutator segment, and the similar process is repeated.

However, as shown in FIG. 10, when the motor, of which the rectification phase is lag, rotates in reverse by the reaction force generated when locked by the stopper and the rotation position is returned, the torque increases, but the increment is small and the generated torque is small in this way, in the case where the motor performs the rectification at a lag angle, when the motor rotates in reverse by the reaction force generated after the motor is locked by the stopper, the generated torque is small even if one brush is positioned on the slit between two commutator segments, and thereby the motor does not start to rotate again.

The motor 12 used in the automotive headlamp 1 according to the present embodiment is configured such that the motor phase is lag when the movable shade 13 is moved to and fixed at the second position (the high beam light distribution pattern forming position) by the driving force generated by the supplied power.

Therefore, when the movable shade 13 abuts against the stopper 10g and the motor 12 is locked at the position near the rotation position where the rectification is switched, the generated torque is smaller and the fluctuation range is also smaller than a motor, of which a motor rectification phase is lead, even if the motor 12 rotates in reverse by the reaction force generated at the time when the motor 12 is locked. Therefore, the possibility that the motor rotates again is small and the motor vibration (abnormal noise) and the high frequency noise generated by the repetition, in which the motor is locked and rotates again, can be reduced.

Furthermore, the motor 12 according to the present embodiment is configured such chat the motor 12 can generate a driving force (torque) to move the movable shade 13 to the high beam light distribution pattern forming position against the force generated by the torsion spring 20. In this way, the movable shade 13 can return to the low beam light distribution pattern forming position without driving the motor 12. Therefore, in the design of the motor 12, it is only necessary to consider rotation in one direction. The design of the motor, in which the motor rectification phase is lag in the predetermined rotation direction, becomes easier.

The present invention has been described herein with reference to the embodiment. Those skilled in the art will understand that these embodiments are exemplary embodiments, various modifications can be made by changing the combination of each structural component and each process, and the modifications are within the scope of the present invention.

What is claimed is:

1. An automotive headlamp comprising:
   a light source;
   a shade configured to be movable between a first position shielding a first volume of light emitted from the light source and a second position shielding a second volume of light different from the first volume;
   a motor configured to generate a driving force to move the shade from the first position to the second position;
   a fixing part configured to fix the shade, which is moved from the first position to the second position; wherein the motor has rotor poles, a motor shaft and a commutator, the commutator is fixed to the motor shaft, a rectification phase of the motor is lag, and an electric current is applied to the motor when the shade is fixed at the second position.

2. The automotive headlamp according to claim 1, further comprising:
   an elastic member configured to generate a bias force for pushing back the shade from the second position to the first position, wherein
   the motor is configured to generate the driving force to move the shade to the second position against the bias force generated by the elastic member.

* * * * *